Figure 3:
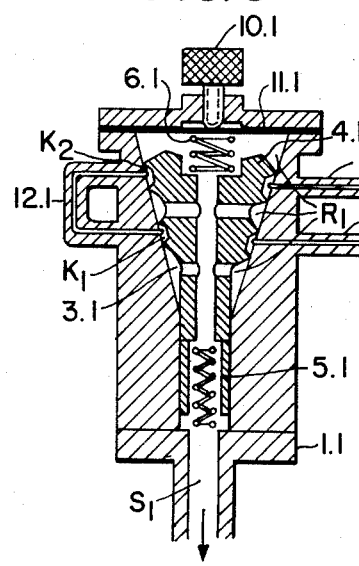

United States Patent
Brunnee et al.

[15] 3,678,656
[45] July 25, 1972

[54] SEPARATING DEVICE FOR MIXTURES OF GASEOUS OR VAPOROUS SUBSTANCES, ESPECIALLY FOR SEPARATING A CARRIER GAS FROM A FRACTION TO BE ANALYZED IN A COMBINED GASCHROMATOGRAPH AND MASS-SPECTROMETER

[72] Inventors: Curt Brunnee, Birkenweg 24, 2820 Platjenwerbe; Hans-Joachim Bultemann, Schlossparkstrasse 57, 2800 Bremen, both of Germany

[22] Filed: April 6, 1970

[21] Appl. No.: 25,919

[30] Foreign Application Priority Data

April 17, 1969 Germany.....................P 19 19 460.6

[52] U.S. Cl..............................................55/197, 55/17
[51] Int. Cl........................................................B01d 53/02
[58] Field of Search...............210/65; 55/67, 197, 386, 464, 55/17

[56] References Cited

UNITED STATES PATENTS 1,747,155  2/1930  Birdsall.....................................210/65

Primary Examiner—John Adee
Attorney—Wolf, Greenfield & Sacks

[57] ABSTRACT

This invention relates to a device for separating mixtures of gasses or vapors. The device utilizes a separating chamber having an inlet for admitting the mixture by viscous flow. The chamber has two outlets, one of which permits molecular flow and the other of which permits viscous flow. Separation occurs when the lower molecular weight fraction of the mixture predominantly leaves the chamber through the outlet permitting molecular flow while the higher molecular weight fraction leaves through the viscous flow outlet. The device may be employed, for example, to separate the helium carrier gas from a hydrocarbon where the mixture is eluted from a gas chromatograph and it is desired to concentrate the hydrocarbon for analysis by mass spectrometry.

8 Claims, 8 Drawing Figures

Patented July 25, 1972
3,678,656
2 Sheets-Sheet 1
FIG. 1
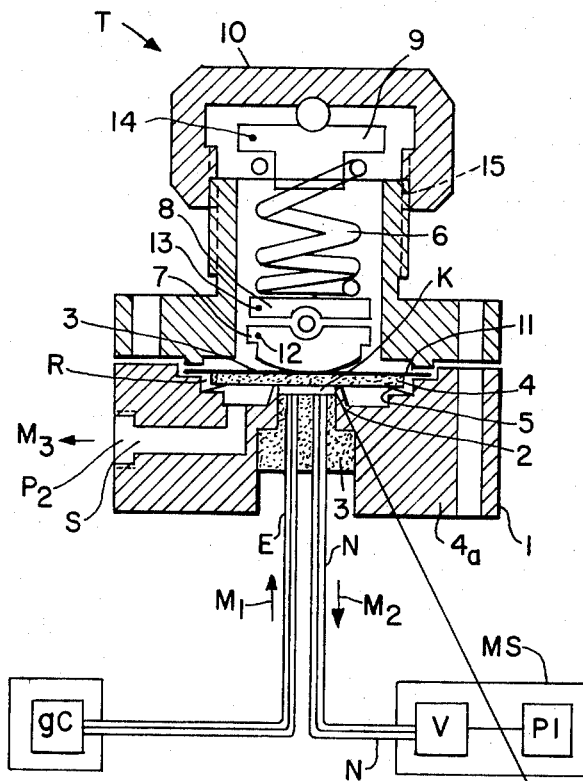
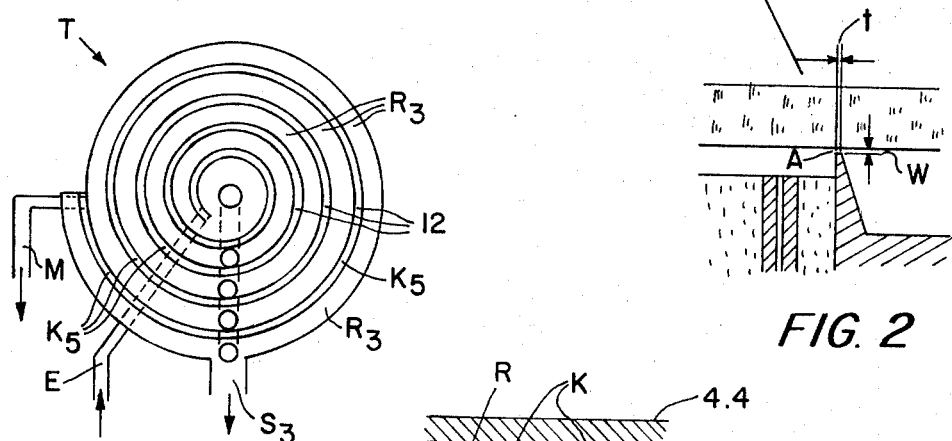
FIG. 2
FIG. 5
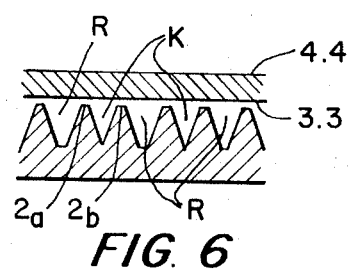
FIG. 6

SEPARATING DEVICE FOR MIXTURES OF GASEOUS OR VAPOROUS SUBSTANCES, ESPECIALLY FOR SEPARATING A CARRIER GAS FROM A FRACTION TO BE ANALYZED IN A COMBINED GASCHROMATOGRAPH AND MASS-SPECTROMETER

In the separating device the first fraction e.g. the gas carrier gas helium is predominently exhausted through the first exit whereas the second fraction e.g. a hydrocarbon together with a rest of the first fraction predominently flow through the second exit into the mass-spectrometer.

Inasmuch as the rate of output flow of the gas chromatograph is essentially higher than the admissible rate of inlet flow into the mass-spectrometer, one purpose of the separating device is to divert a small portion of the output flow of the gaschromatograph for analysis by the mass-spectrometer. By selective branching of the second fraction the concentration of said fraction to be analyzed is increased whereas a high loss of the second fraction results when a non-selective partition of the output flow from the gaschromatograph is utilized. By using a selective separating device it is possible to increase the sensitiveness of measurement and proof of evidence of fractions to be analyzed e.g. in a gaschromatograph-mass-spectrometer combination.

The selective suction of the first fraction through the first exit of a separating device can be performed in different manners.

In a separating device of the kind disclosed in German Pat. No. 1,052,955, the selective suction of the first fraction is achieved by passing the gas mixture to be separated through a nozzle-like opening and dividing the expanding stream by using a diaphragm which lets pass the core area and keeps back the outer jacket-like area of the stream. The core area is led into the mass-spectrometer whereas the jacket area is exhausted by a pump from the space between the nozzle and diaphragm, said space forming a separating chamber. The molecules of the first fraction such as helium on account of its lower molecules weight diffuses predominently into the jacket area so that the first fraction is thereby predominently exhausted by the pump.

In a separating device of the type described in British Pat. No. 1,065,131, the predominant separation of the carrier gas helium as a first fraction is attained by utilizing the pores of a porous wall portion of the separating chamber as the first exit. Where the width of the pores is equal to or less than the medium free way of the gas molecules, the flow-conductivity of the porous wall is equal to the reciprocal value of the square root of the molecular weights of the concerned gas components; thus the lighter weight carrier gas helium is exhausted predominently through the first exit.

The principal disadvantage of all these known separating devices is that the optimal output of the second fraction (to be analyzed) which can be obtained from the second exit is reached only in connection with a certain volume of gas inlet flow into the separating chamber. Proceeding on the assumption that the separation is carried out by a single-stage separating device containing e.g. a porous wall as first output and dimensioned so that the inlet flow is viscous, with an inlet flow of 10 ml/min of argon and helium and a second output flow leaded into the mass-spectrometer the percental effective output e.g. the proportion of the quantity of Argon within the second output flow to the quantity of Argon within the inlet flow is 26 % but is only 3 % with an inlet flow of 1 ml/min.

In order to overcome this limitation of the measurability different methods have been applied:

1. A first method to overcome this limitation is to connect the exit of the gaschromatograph to enable by-passing the separating device immediately to the inlet of the mass-spectrometer or to insert interchangeable throttles into the inlet and/or second exit of the separating device. These methods are subjected to an undesirable loss of measuring time.

2. A second method is the insertion of an adjustable throttle into the line between the separating device and the mass-spectrometer. It is possible thereby to enlarge the range of measurability, however, such a throttle generally prevents the inlet flow into the mass-spectrometer from being viscose. Thus the additional enrichment of the fraction to be analyzed which would be obtained with a viscous inlet flow is lost because the exhaust from the mass-spectrometer runs off molecularly.

3. An enlargement of the range of measurability can also be attained by insertion of an adjustable throttle valve into the pipe between the porous wall at the first exit and the pump for the first output, however, there is only a very small range of adjustability and moreover the disadvantage occurs that memory-effects disturb the measurement on account of a backwards directed diffusion from the space between the throttle valve and the first exit.

The main object of the present invention is to provide a separating device which has a simple construction and which enables an extensive accommodation to the different gas quantities thus enabling an optimal effective output of fractions to be analyzed.

In accordance with the invention the first exit is made adjustable to permit regulation of the quantity of the first output. Thus, as experiments have shown, it is possible to vary the first output to a high degree and notwithstanding to maintain the molecular flow conditions which are necessary to obtain a separating effect.

An embodiment of good adjustability is attained by using an elongated slit as the first exit. In this case the amount of first output can be adjusted by changing the width of the slit. The device is constructed in such a manner that the slit is formed by an edge and a wall arranged parallel to the edge.

It is useful to form the separating chamber like a long channel one end of which is connected to the inlet and the other end of which is connected to the second exit for viscous flow to the mass-spectrometer.

A simple and compact construction is attained by forming the separating chamber like a ringshaped chamber with inlet and exit at diametrically opposed points. In this case slit-exits as second exit are arranged at opposite sides along the ringshaped chamber.

A large length of the separating chamber combined with a compact construction may be obtained by connecting several separating chambers in series. A further improvement in separating effect may be secured by making the connections from separating chamber to separating chamber for viscous flow and by simultaneously making the velocity of flow within the connections so fast that this velocity of flow is faster than the velocity of diffusion of the effective fraction.

Such a multistage arrangement can be additionally improved by making the first exits of the several separating chambers adjustable independently from one another so that an optimal adjustment may be reached in each stage.

The separating channel may be formed like a spiral or helix. Then the first exit can also form a spiral or helix so that separating chamber and exit channel form a double-spiral or helix.

If the separating chamber over its whole length or here and there is dimensioned for viscose flow then an elongation of the chamber results in an enlargement of the separating effect provided that the velocity of flow is higher than the velocity of diffusion of the effective fraction of the output at the first exit.

In the drawing are shown some embodiments of the invention.

Figure 7:
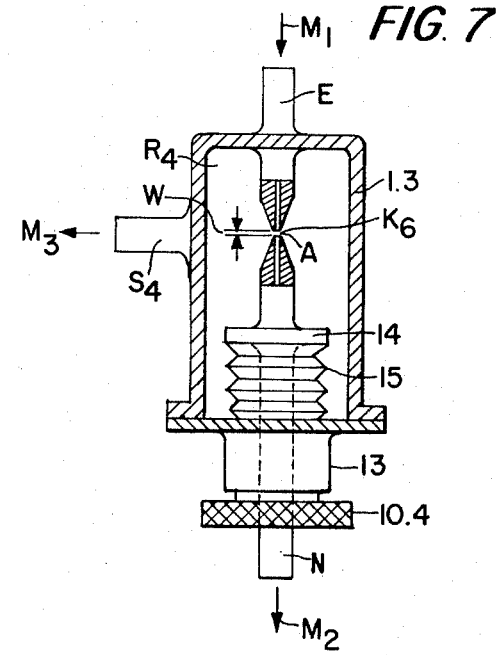
Figure 4:
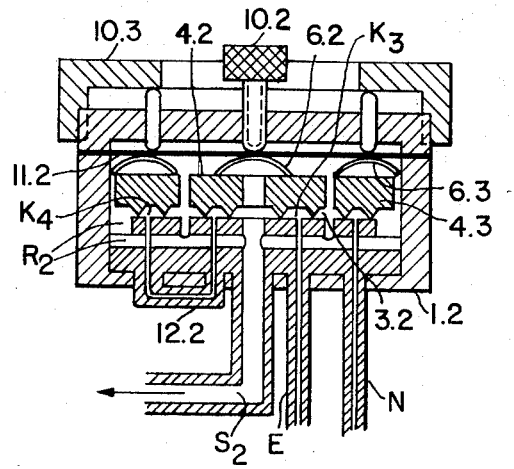
Figure 8:
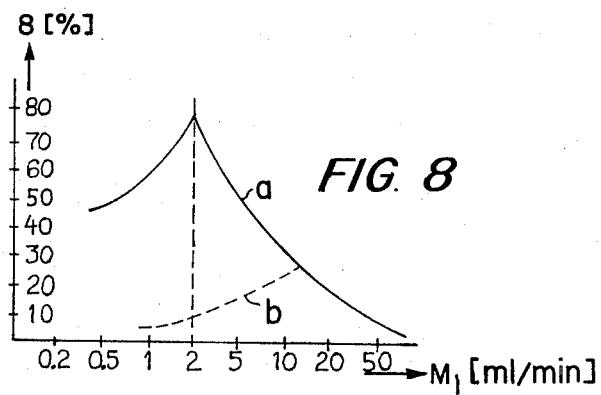

FIG. 1 shows a first embodiment of a gaschromatograph-mass-spectrometer-system with a separating device according to the invention, FIG. 2 a cross-sectional view of the first exit of the separating device according to FIG. 1 on an enlarged scale, FIG. 3 a cross-sectional view of a multistage separating device with a common adjustment of the several stages, FIG. 4 a cross-sectional view of a multistage separating device with separated adjustment of the several stages, FIG. 5 a separating device with a spiral separating chamber, FIG. 6 a fractional cross-sectional view along line 6—6 of FIG. 5, FIG. 7 a different embodiment of a separating device, and
FIG. 8 a diagram for illustration of the operation.

The invention now shall be illustrated in its application for analysis of gas by a combined gaschromatograph-mass-spectrometer-system. The gas mixture M eluted from the column of the gaschromatograph GC consists of a first fraction e.g. the carrier gas helium and a second gas fraction e.g. a hydrocarbon. The mixture enters an inlet E into a separating chamber K of a separating device T. This separating chamber K is provided with two exits, namely a first exit A, also called waste exit or exhaust exit, and a second exit N. The second exit N is a throttle pipe which is dimensioned so as to form a pipe for viscous flow, provided normal pressures. The second exit N is connected to the vacuum chamber V of a mass-spectrometer MS which is held under high vacuum pressure by a pump $P_1$. The first exit A is connected to an exhaust channel R and an exhaust pipe S connects the exhaust channel R to a pump $P_2$. Therefore a branching of the inlet flow $M_1$ takes place in the separating chamber K. A first exit flow or first output $M_3$ is drawn off by pump $P_2$ or is led to a regenerator, whereas the second exit flow or second output $M_2$ is subjected to an analysis by measuring the mass spectrum of the gas mixture of exit flow $M_2$. The inlet flow $M_1$ consists of the second fraction to be analyzed and the carrier gas helium as first fraction needed for the gaschromatography.

In the separating device according to the invention the measurement over a wide range of inlet quantities is controllable because the first exit A which is dimensioned for molecular flow is made adjustable. For this purpose the exit A is given the form of a long slit the width $w$ of which is adjustable. Thereby a large range of control can be attained with a most small first output if the slit of the first exit has been closed and with a big first output at the widest adjustment of the slit. Over the whole range of adjustment the condition must be fulfilled that the flow through the first exit is molecular because molecular flow is the basis for the supposition that the gas of less weight e.g. the carrier gas helium will predominently pass the first exit. This condition is fulfilled if the width $w$ of the slit is given the same order as or is made smaller than the mean free path length of the molecules of the carrier gas at the pressure existing within the separating device. If the depth $t$ of the slit is made sufficient small and the width $w$ of the slit small enough to ensure molecular flow through the slit then it is possible to obtain rates of first output within the required order (up to 100 ml/min).

With a device constructed according to the invention it was possible to change the first output $M_3$ by adjusting the slit width $w$ between 0.02 and 0.002 mm in such a manner that with an inlet flow $M_1$ between 60 ml/min and 2 ml/min the second output $M_2$ was maintained at 1 ml/min. The depth $t$ of the slit was approximately 0.1 mm and the length of the slit about 100 mm. The pressure was at about 20 to 50 torr.

Having given a general description of a device according to the present invention the embodiments shown in FIGS. 1 to 7 now shall be described more in detail.

In all embodiments the separating device is provided with a casing 1 consisting of several parts and having one or more separating chambers with inlet E, first exit A, second exit N, an exit channel R connected to the first exit A and an arrangement for adjusting the first exit A.

The inlet E is formed as a capillary one end of which is connected to the column (not shown in the drawing) of the gaschromatograph GC whereas the other end is connected to the separating chamber K (single-stage device FIG. 1) or to the separating chamber $K_1$ (FIG. 3) or $K_3$ (FIG. 7) of the first stage in multistage devices. The second exit N also consists of a capillary one end of which is connected to the separating chamber K (FIG. 1) or to the separating chamber $K_2$ (FIG. 3) or $K_4$ (FIG. 4) of the last stage in multistage devices whereas the other end is connected to the vacuum chamber V of the mass-spectrometer MS. The slitshaped first exits A of all embodiments with exception of FIG. 7 are formed by the combination of an edge 2 and a wall arranged parallel with said edge whereas in FIG. 7 this first exit is formed by two parallel edges. The depth $t$ of the slit between edge 2 and wall 3 is made small in order to attain a high rate of flow even with a small width $w$ of the slit. Preferably the depth $t$ is made between 1 mm. and 0.001 mm.

The width $w$ of the slit is made adjustable. The upper limit of width $w$ is reached at the width where the flow through the slit changes from molecular to viscous flow. With increasing width $w$ the character of flow gradually changes into an area in which the separation device generally fulfills the function of a flow divider without a selective separating function. The lower limit of the width $w$ is subject to the condition that the slit must not be completely shut. The remaining opening or width is defined by the surface conditions. A variation of the width $w$ at the rate of 100 to 1 can be reached already with simple means for surface finish.

Curve $a$ of FIG. 8 shows the function $B = f(M_1)$ where B is the effective output and $M_1$ is the inlet flow e.g. the proportion of quantities of the effective fraction at the inlet and second exit whereby the width $w$ of the first exit A is controlled in such a manner that the output at the second exit is constant independent on changes of the inlet flow $M_1$. The gain or relative effective output from the second exit of the second fraction to be analyzed highly increases with decreasing inlet flow $M_1$ and simultaneous throttling of first output $M_3$ at the first exit. It is true that the effective output will decrease if after having reached the minimum of width $w$ the inlet flow $M_1$ continues to decrease because the viscous flow of the output $M_2$ into the vacuum chamber of the mass spectrometer will decrease more than the output $M_3$. However, this decrease of the effective output starts at $M_1 = 2$ ml/min from a very high value of effective output B = 83 % and therefore is of no weight as may be seen from a comparison with curve $b$ of FIG. 8 illustrating the function $B = f(M_1)$ of an analogous one-stage separating device of the kind having a porous wall as the first exit. In such a device the decrease of relative effective output B begins at the maximum of admissible inlet flow $M_1$ of 10 ml/min so that at $M_1 = 1$ ml/min the relative effective output is only 3 % compared with approximately 60 % in the separating device of the present invention in which besides the inlet flow $M_1$ into the separating device may be increased up to 60 ml/min.

The device according to the invention utilizes an adjustable first exit which makes it possible to adapt the total output at the first exit optimally to the inlet flow $M_1$ thereby avoiding unnecessary losses through the first exit and securing basically higher rates of relative effective output B than is possible with hitherto known separating devices having an unchangeable width $w$ at the first exit.

In the first embodiment according to FIG. 1 and 2 the ringshaped edge 2 is arranged parallel to wall 3 formed by the bottom side of an adjustable element 4 in the form of an smooth circular plate. This adjustable element may consist of metal, glass, ceramics or plastics; it is preferably made of quartz.

The width $w$ of the slit between edge 2 and wall 3 is adjusted by an adjusting arrangement consisting of a resetting spring 5, an adjusting spring 6, pressure elements 7, 8, 9, a capshaped adjusting screw 10 and an resilient diaphragm 11 which forms a vacuum-tight closure of casing 1 and transmits the movement of pressure element 7 to the adjustable element 4.

FIGS. 3 and 4 show different embodiments of two-stage separating devices. Two separating chambers $K_1, K_2$ (FIG. 3) and $K_3, K_4$ (FIG. 4) within casing 1.1 (FIG. 3) and 1.2 (FIG. 4) respectively are connected in series. The first separating chamber $K_1$ (FIG. 3) and $K_3$ (FIG. 4) are each connected to the inlet E and the second chamber $K_2$ (FIG. 3) and $K_4$ (FIG. 4) are each connected to the second exit N. Chambers $K_{1,2}$ (FIG. 3) and $K_{3,4}$ (FIG. 4) are connected by a channel 12.1 (FIG. 3) and 12.2 (FIG. 4) respectively. This connecting channel 12.1 (FIG. 3), 12.2 (FIG. 4) is dimensioned in such a manner that at the given pressures the flow from the first to the second separating chamber is viscose and the velocity of flow within the connecting channel is high compared with the velocity of diffusion of the second fraction of the first output. Thereby the total separating effect which is obtained is equal to the product of the separating effects of the two stages. The first exits are connected to a common exhaust channel $R_1$ or $R_2$ which are respectively provided exhaust pipes $S_1$ and $S_2$.

The embodiments of FIG. 3 and 4 differ from the embodiment of FIG. 1 essentially in that the separating chambers $K_1$ and $K_2$ (FIG. 3) and $K_3$ and $K_4$ (FIG. 4) are formed as long channels having one end connected to the inlet whereas the other end is connected to the second exit, and the first exit extends between inlet and second exit. The separating chambers are ringshaped channels in which inlet and exit are at diametrically opposed points. Another difference is that each separating chamber is provided with two second exits which are arranged at opposite sides along the ringshaped chamber.

In the embodiment of FIG. 3 the edges 2 are supported by a conical adjustable element 4.1 whereas the wall 3.1 opposite the edges 2 is formed by the inside of casing 1.1 as a conical surface parallel to the edges 2. The adjusting arrangement is provided with a resetting spring 5.1, an adjusting spring 6.1 and an adjusting screw 10.1.

In the embodiment of FIG. 4 the second exits A of both separating chambers $K_3$ and $K_4$ between the edges 2 and opposing wall 3.2 are separately adjustable, so that a better adaption to different pressures within the two separating chambers may be attained. For this purpose the edges of the second exits of the separating chamber $K_3$ of the first stage are arranged at the bottom side of a circular plateshaped first adjustable element 4.2 whereas the edges of the second exits of the separating chamber $K_4$ of the second stage are arranged at the bottom side of a ringshaped second adjustable element 4.3 which concentrically surrounds the first adjustable element. Both adjustable elements are engaged by not shown resetting springs and separated adjusting springs 6.2 engaging the adjustable element 4.2 is engaged by a central adjusting screw 10.2 whereas the adjusting spring 6.3 engaging the second adjustable element 4.3 is engaged by a capshaped adjusting screw 10.3 through a vacuum tight diaphragm 11.2. The second exits A are connected to a common channel system $R_2$ which is connected by an exhaust pipe $S_2$ to pump $P_2$. In both embodiments of FIG. 3 and 4 the vacuum tight closing is attained by a diaphragm 11.1.

In the embodiment of FIG. 5 and 6 the separating chamber $K_5$ is formed like a spiral. The separating chamber $K_5$ and the spiralshaped exhaust channel $R_3$ connected to exhaust pipe $S_3$ are like a double spiral and are formed by a double spiral edge 2a, 2b and the wall 3.3 of a platelike adjustable element 4.4 which is adjustable relative to the edges 2a, 2b to adjust the width w of the second exit A.

The separating chambers in the form of long channels, especially the spiralshaped separating chamber $K_5$ in FIG. 5 and 6 are preferably dimensioned for viscous flow from the inlet to the first exit in order to secure an improvement of the separating effect.

FIG. 7 depicts an embodiment in which the separating chamber $K_6$ exists of the mouth areas in front of two coaxial tubes which are directed against one another. The mouths are made as edges 2c, 2d and form a ringshaped exit. The width w of this slit which is shown unnaturally large in FIG. 7 is adjustable by axial shifting of exit N which is shiftable within a neck 13 of casing 1.3. The exit N can be adjusted by an adjusting screw 10.4 and is vacuum-tight connected to the casing 1.3 by a flange 14 and bellow 15. The casing 1.3 surrounds the exhaust chamber $R_4$ with which is connected the exhaust pipe $S_4$. Modifications are possible within the scope of the invention; the embodiment with long channelshaped separating chamber may be useful also in connection with separating devices which have a slit as second exit of fixed width w. The rate of second output could be also adjusted by changing the length of the slit.

We claim:

1. A device for separating mixtures of gaseous or vaporous substances into a first fraction of lower molecular weight and a second fraction of higher molecular weight, the device comprising means forming a separating chamber, an inlet through which the mixture viscously flows into the separating chamber, the separating chamber having a movable wall spaced from a fixed wall to provide an elongated narrow slit therebetween, means coacting with the movable wall for changing the gap between the movable wall and the fixed wall whereby the narrow slit provides a first exit whose gap is adjustable within the range permitting molecular flow of the first fraction through the slit to an exhaust passage, and the separating chamber having a second exit permitting the second fraction to viscously flow out of the chamber.

2. the separating device according to claim 1 wherein one of the walls providing the first exit slit has a thin edge defining one side of the slit and the other wall has a relatively broad surface parallel to the thin edge and defining the other side of the slit.

3. The separating device according to claim 1, wherein the separating chamber is in the form of a long channel having the inlet at one end and the second exit at the opposite end.

4. The separating device according to claim 3, wherein the first exit extends substantially along the entire length of the channel.

5. The separating device according to claim 4, wherein the long channel is in the form of a spiral.

6. The separating device according to claim 5, wherein the device further includes an exhaust passage forming a spiral contiguous to the separating chamber and forming therewith a double spiral.

7. The separating device according to claim 2 wherein the separating chamber is annular, and the inlet and second exit are disposed at diametrically opposite locations on the annulus to obtain the greatest separation therebetween.

8. The separating device according to claim 1, further comprising means forming a second separating chamber, the second chamber having an independently moveable wall spaced from a fixed wall to provide an elongated narrow slit therebetween whose gap can be adjusted, the two separating chambers being connected by a channel dimensioned for viscous flow whereby the velocity of flow in the connecting channel is greater than the velocity of diffusion of the second fraction across the first exit.

* * * * *